United States Patent Office 2,872,282
Patented Feb. 3, 1959

2,872,282

METHOD OF INHIBITING CORROSION IN STEAM LINES

Leonard H. Englund, Brownsville, Minn.

No Drawing. Application September 19, 1955
Serial No. 535,287

6 Claims. (Cl. 21—2.7)

This invention relates to a composition and method for reducing the corrosion in steam boilers and conduits which is promoted by carbon dioxide and oxygen which may be present in the steam and condensate.

In particular, it provides a composition and method for retarding the rates of corrosion effected by these causative agents, whereby the products of reactions and residual products are free of deleterious effects on the flavor and quality of beverage and foodstuffs which are contacted by the steam and condensates.

There are many operations in plants which process edible products for human consumption in which it is desirable to employ steam in direct contact with these products for cooking or heating purposes, or steam in direct contact with the surfaces of processing equipment for the purposes of scalding and cleaning. Among such plants there may be listed breweries, canneries for fruits and vegetables, cheese makers, meat packing, and milk drying and evaporating plants.

Among the numerous organic compounds of potential usefulness in reacting with carbon dioxide and oxygen in steam, I have found that some cyclic ethers are effective, and in particular the class of cyclic ethers containing the three-membered ring, comprising the epoxides. The epoxides, -ethylene oxide and propylene oxide, are reactive in great degree. To accomplish the objective of reducing the corrosive effects of carbon dioxide and oxygen in steam generators, and steam and condensate conduits, by means which afford immunity from results which would cause undesirable tastes or harmful residues, I have selected propylene oxide (1,2-epoxy propane) as the source of the epoxy ring.

When this compound is diffused in the steam, there is energetic combination with the carbon dioxide and oxygen present. In the interval of time during the transit of the steam flow, there are reversals in some reactions resulting in states of equilibrium according to ambient conditions. Propylene carbonate is formed. When the steam reaches the open air, this propylene carbonate breaks down into propylene oxide and carbon dioxide, which diffuse into the atmosphere. The surplus unreacted epoxy component also passes into the atmosphere and is eliminated. Some propylene glycol is formed. The quantity which may remain on the equipment surfaces, or the material being processed, is minute, and it is not deleterious. The reaction may proceed as follows:

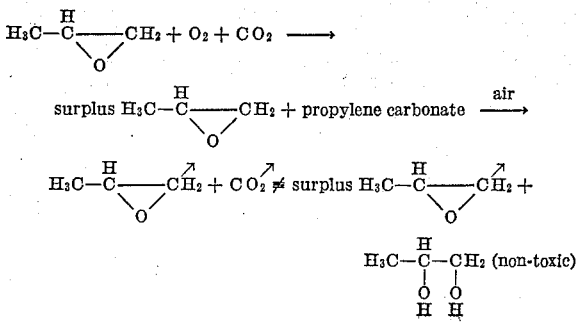

Propylene glycol is a satisfactory ingredient for foodstuffs and is listed in the XIV-th revision of the U. S. Pharmacopeia. It is used as a preferred solvent in many flavor extracts, food-coloring preparations, cosmetics, and pharmaceutical preparations. Propylene glycol is also used as an anti-freeze in installations such as sprinkler systems; brewery, dairy, and other refrigeration systems where the coolant accidentally may come in contact with food. One manufacturer (Carbide and Carbon Chemical Company) of propylene glycol states in published trade correspondence that the Federal Food and Drug Administration has indicated that it does not object to the use of propylene glycol as a replacement for glycerol in the amounts normally used in food products such as flavoring extracts, and that propylene glycol appeared to be reasonably safe for pharmaceutical use, even in preparations appropriate for self-medication.

Published information by the same manufacturer states that propylene carbonate has low toxicity, it shows no irritating effects on contact with the skin and is considered to be of low order of toxicity by inhalation.

Propylene oxide is non-toxic, one of its uses being to aid in the control of micro-biological spoilage in dried fruits. A manufacturer of this material (Carbide and Carbon Chemical Company) recommends that it be added to the dried fruit in the final packaging operation at the rate of 1 cc. per pound of dried fruit.

My preferred composition for introducing the propylene epoxide into the stream is a polymeric product. The degree of hydration of the phosphoric acid reacted with propylene oxide may range from ortho, pyro, meta or tetra to phosphoric anhydride. My preferred composition may be produced by reacting about 75 parts of phosphorus pentoxide with 25 parts of water. This solution is cooled, then slowly added in small increments, with effective mixing and cooling, to propylene oxide, in a ratio of about one part by weight of the acid to six to ten parts by weight of the propylene oxide. The surplus and unreacted propylene oxide is removed by evaporation.

The alkalinity of the boiler water reacts with the phosphoric acid component to form sodium phosphates and in consequence of this neutralization and the temperature of the boiler water, the propylene epoxide ring radical is liberated and diffused into the steam stream. The reaction may proceed as follows:

$$P_2O_5 + H_2O \longrightarrow H_3PO_4$$

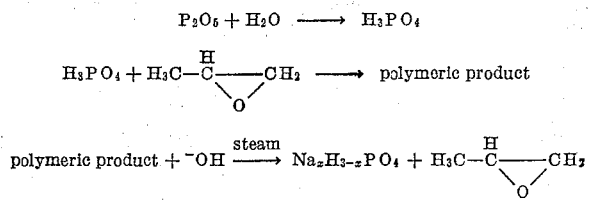

where $x$ is from 1 to 3. The phosphoric acid component at once combines with the sodium alkalinity in the boiler water, and in turn with any free calcium and magnesium ions, forming the phosphates, and hence does not leave the boiler.

About 1.5 to 2.0 parts per million of the above product is added to the boiler feed water pump intake for each one part per million $CO_2$ in the steam or in most cases, the corrosion inhibitor is added to the boiler water make-up at the rate of 2 to 5 parts per million of make-up water, so that it is clear that the amount of propylene products that may be present in the residue is extremely small.

In the matter of naming of the new composition mentioned above as "polymeric product," it is most correct to describe it as a polyepoxypropane acid phosphate, because there is a secondary reaction following immediately after the combination of the $P_2O_5$ with the propylene oxide, in which the limpid liquid heats up and becomes viscous. Since the esterification of the propylene oxide with phosphoric acid opens the ring, it is clear that the product produced is not an epoxy propane. The product probably is polypropylene glycol phosphate, the phosphoric ester of the glycol.

The depolymerization which takes place in the steam boiler probably proceeds as follows:

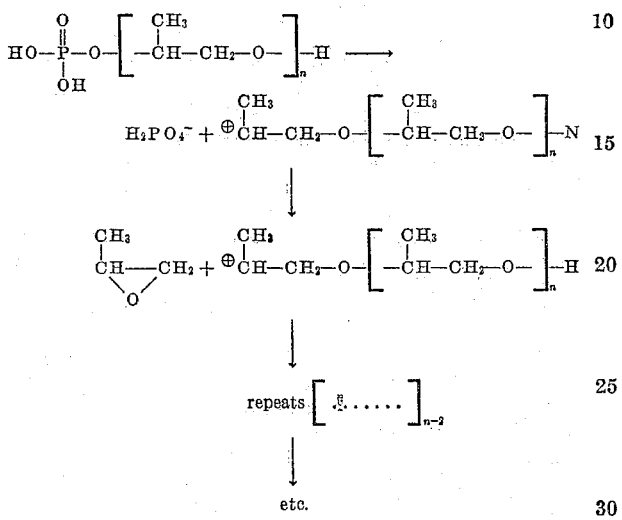

etc.

It is possible that the same end product may be obtained by the esterification of the polypropylene glycols with $P_2O_5$ and water.

The esterification of the polypropylene glycols proceeds as expected and the final product functions in a manner similar to that of the end product obtained by the use of propylene oxide. This product contains more water. The higher polymers are water insoluble, while the lower molecular weight polymers are soluble.

It has been found desirable to retain in the product the unreacted propylene oxide as this permits the utilization of the vapor pressure as a pressurized feed in dispensing the product into the boiler water feed line, so that a needle valve may be used in regulating the rate of feed.

Although the polymeric product is an extremely suitable material for injection into steam lines to control corrosion, the ammonium salt of the polyepoxypropane acid phosphate is preferred as an inhibitor of steam and condensate lime corrosion. It is formed by the addition of $NH_3$ as such, or as the carbonate, to the product after preparation as described.

The purpose in forming the ammonium salt of the polypropylene glycol phosphate is that this provides an alkaline catalyst diffused in the steam which favors the reactions between the propylene oxide and the carbon dioxide and oxygen in the steam: the sodium alkalinity in the boiler water saponifies the ester, liberating in gaseous form the propylene oxide and the ammonia.

As an alternative step, ethylene oxide and/or propylene oxide may be introduced directly into the main steam header, but the extreme hazards and difficulties inherent in this procedure make this method undesirable.

Another composition for introducing the epoxy ring radical into the steam flow may be a low molecular weight (2000) partially-oxidized, polyethylene product; the rigorous conditions of alkalinity, temperature and pressure obtaining in the boiler effecting depolymerization of the polymer to yield the epoxide. From the practical standpoint, there are many factors in favor of this procedure; for example, the process is simpler and less hazardous than making the polypropylene glycol phosphate.

The following example illustrates the application of my invention:

Example

The contents of a 60 pound drum of $P_2O_5$ was carefully added to 2.5 gallons of water. After cooling, 45 pounds of this solution was added over a period of several hours, with effective cooling and mixing in a water-jacketed reaction vessel, to the contents of a 55 gallon drum of propylene oxide. The resulting product is a slightly colored viscous liquid.

In a boiler operating at 120 lbs. gauge pressure, about 50 gallons of well water was added as feed water make-up during a 2-hour run, and during this run 18 grams of the product was allowed to drip into the feed water pump suction. The $CO_2$ content of the steam previously had ranged around 60 p. p. m. and during the run dropped to 6 to 8 p. p. m. Some of the steam during this run was used as jets to heat and stir cheese curd. No undesirable change in taste of the cooked curd could be detected.

A tinned milk can was steamed out, drained and permitted to cool. After being filled with milk and allowed to stand an hour, no taint in the taste of the milk was noticeable.

Having thus disclosed my invention, I claim:

1. In the operation of a steam boiler system comprising metallic reservoirs and lines containing water which is boiled therein to provide steam, the improvement which comprises introducing into said water a substance selected from the group consisting of a polymeric product formed by reacting propylene oxide with phosphoric acid, a polymeric product formed by reacting propylene oxide with phosphoric anhydride and salts of said products.

2. The improvement of claim 1 wherein said substance is a polymeric product formed by reacting propylene oxide with phosphoric acid.

3. The improvement of claim 2 wherein said substance is an ammonium salt of the product of claim 2.

4. In the operation of a steam boiler system comprising metallic reservoirs and lines containing water which is boiled therein to provide steam which contact edible substances, the improvement which comprises introducing into said water a substance selected from the group consisting of a polymeric product formed by reacting propylene oxide with phosphoric acid, a polymeric product formed by reacting propylene oxide with phosphoric anhydride and salts of said products.

5. The improvement of claim 4 wherein said substance is a polymeric product formed by reacting propylene oxide with phosphoric acid.

6. The improvement of claim 5 wherein said substance is an ammonium salt of the product of claim 5.

References Cited in the file of this patent
UNITED STATES PATENTS

| | | |
|---|---|---|
| 2,541,027 | Bradley | Feb. 13, 1951 |
| 2,575,298 | Rzynor | Nov. 19, 1951 |
| 2,580,924 | Jacoby | Jan. 1, 1952 |
| 2,660,563 | Banes et al. | Nov. 24, 1953 |

UNITED STATES PATENT OFFICE
Certificate of Correction

Patent No. 2,872,282                                                          February 3, 1959

Leonard H. Englund

It is hereby certified that error appears in the printed specification of the above numbered patent requiring correction and that the said Letters Patent should read as corrected below.

Column 3, line 14, extreme right-hand portion of the formula, for "—N" read ———H—; lines 18 to 21, inclusive, right-hand portion of the formula should read as shown below instead of as in the patent:

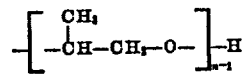

Signed and sealed this 30th day of June 1959.

[SEAL]

Attest:
KARL H. AXLINE,
*Attesting Officer.*

ROBERT C. WATSON,
*Commissioner of Patents.*